United States Patent [19]

Gotoh et al.

[11] 4,349,005
[45] Sep. 14, 1982

[54] SUCTION MIXTURE CONTROL SYSTEM FOR VEHICLE ENGINES

[75] Inventors: Osamu Gotoh, Kurume; Yutaka Otobe, Niiza; Michio Kawamoto, Tokyo; Akira Fujimura, Niiza, all of Japan

[73] Assignee: Honda Giken Kogyo Kabushiki Kaisha, Tokyo, Japan

[21] Appl. No.: 228,222

[22] Filed: Jan. 26, 1981

[30] Foreign Application Priority Data

Feb. 2, 1980 [JP] Japan .................................. 55-11761

[51] Int. Cl.³ ............................................ F02M 25/06
[52] U.S. Cl. ..................................... 123/571; 123/568
[58] Field of Search ................................ 123/568, 571

[56] References Cited

U.S. PATENT DOCUMENTS

| 3,282,261 | 11/1964 | Bartholomew . | |
|---|---|---|---|
| 3,680,318 | 8/1972 | Nakajima et al. | 60/278 |
| 3,800,766 | 4/1974 | Schubeck | 123/568 |
| 4,257,382 | 3/1981 | Matsui et al. | 123/571 |

FOREIGN PATENT DOCUMENTS

| 53-17803 | 2/1978 | Japan | 123/571 |
|---|---|---|---|
| 54-30304 | 3/1979 | Japan | 123/571 |
| 54-36425 | 3/1979 | Japan | 123/571 |
| 54-72334 | 6/1979 | Japan | 123/571 |
| 55-54658 | 4/1980 | Japan | 123/571 |
| 2068459 | 8/1981 | United Kingdom | 123/571 |

Primary Examiner—Wendell E. Burns
Attorney, Agent, or Firm—Lyon & Lyon

[57] ABSTRACT

An internal combustion engine for a vehicle has an exhaust gas recirculation system for returning exhaust gases to the engine intake passage. The carburetion system for the engine includes a fuel enrichment valve. Sensors for high vehicle speed and low vehicle speed control the fuel enrichment valve and a valve in the recirculation passage so that the fuel enrichment valve and the exhaust gas recirculation valve are controlled in a manner so that exhaust gas recirculation and fuel enrichment are increased in a lower vehicle speed range, and decreased in a higher vehicle speed range.

7 Claims, 2 Drawing Figures

SUCTION MIXTURE CONTROL SYSTEM FOR VEHICLE ENGINES

This invention relates to a suction mixture control system for a vehicle engine employing exhaust gas recirculation.

Exhaust gas recirculation systems are conventionally employed in engines which operate to return part of the exhaust gas emitted from the engine to the engine intake passage via an exhaust gas recirculation passage during the operation of the engine to prevent excessive increase of the combustion temperature of the mixture in the engine cylinders. Lowering of the combustion temperature reduces the output of nitrogen oxides which are objectionable from the standpoint of atmospheric air contamination. Further, a system is also known which operates to supply the engine with a mixture having a high overall air-fuel ratio in order to reduce the concentrations of hydrocarbon, monoxide, nitrogen oxides, etc. contained in the exhaust gas. The above two systems can both be employed in engines so as to further reduce the concentration of nitrogen oxides in the exhaust gas. However, all the above-mentioned systems have to some degree an unfavorable influence upon the driveability of the vehicle, particularly the ability of the engine to operate in an optimum fashion at very low vehicle speed and very high vehicle speed.

The present invention has been devised in view of the above circumstances, and it is an object of the invention to provide a system of the above-mentiond type which, during low vehicle speed, operates to increase the quantity of auxiliary fuel being supplied to the engine to compensate for insufficient engine power, and at the same time increase the flow rate of exhaust gas being returned to the engine intake passage. This has the effect of limiting increase of the combustion temperature which would be caused by the increased fuel quantity. It is also an object of this invention to decrease the quantity of auxiliary fuel as well as to decrease the rate of recirculation of exhaust gas, during high vehicle speed. The new system thereby contributes to enhancement of the engine power characteristic, prevention of air contamination, and improvement in fuel economy.

Figure 1:
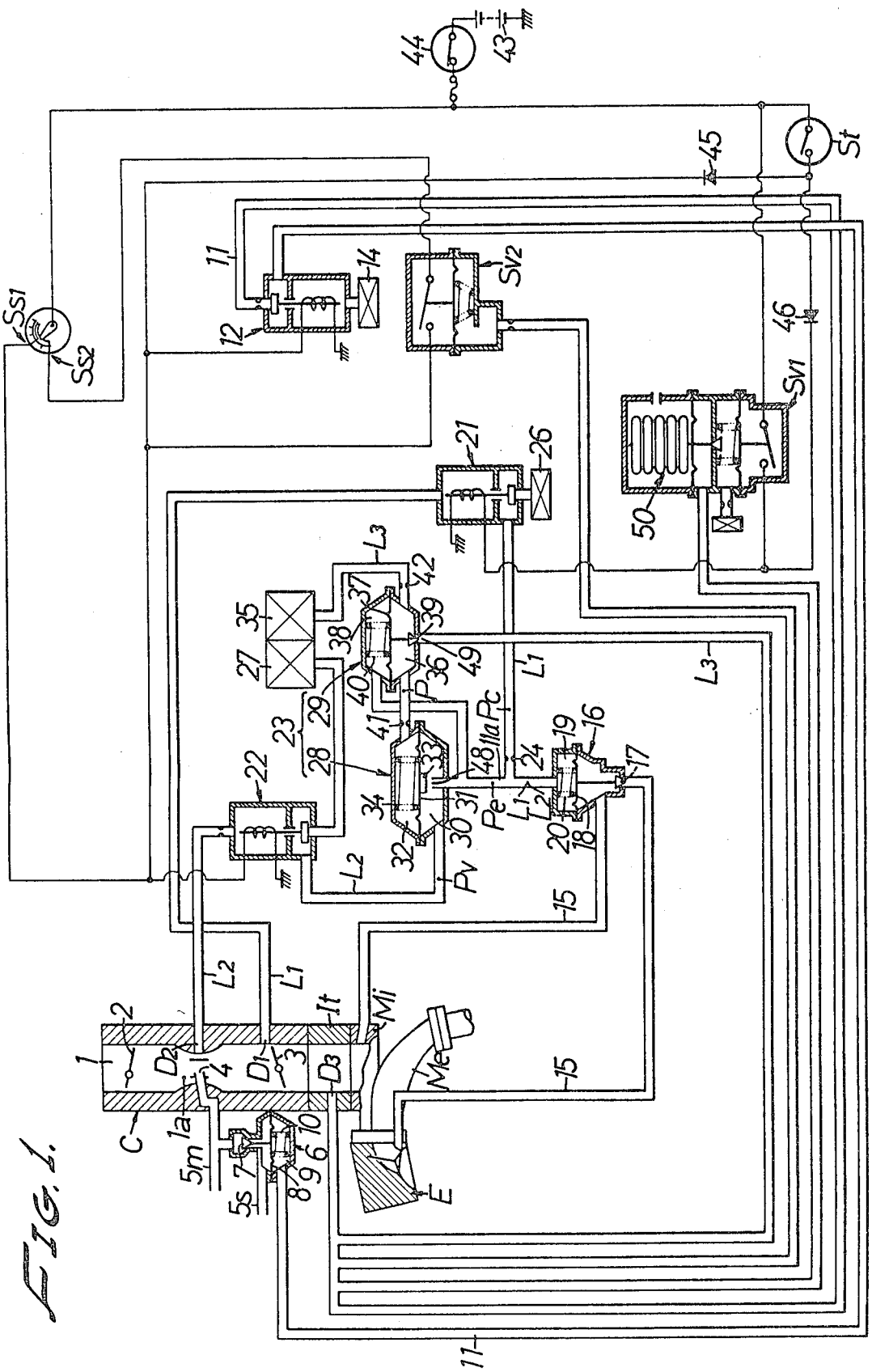
FIG. 1 is a schematic diagram, partly in section, showing a preferred embodiment of this invention.

Referring to the drawings, the automobile engine generally designated E is provided with an intake manifold Mi and an exhaust manifold Me. A carburetor C is connected to an upstream end of the intake manifold Mi through a heat insulating barrel It.

The carburetor C includes a venturi 1a provided in the intake passage 1. A choke valve 2 is positioned upstream of the venturi 1a and a throttle valve 3 is positioned downstream of the venturi 1a. A fuel nozzle 4 opens into the venturi 1a. The intake manifold Mi, the heat insulating barrel It and the carburetor C constitute the intake passage 1 of the engine E. A first suction port D1 is located in the vicinity of or downstream from the throttle valve 3, and a second suction port D2 opens into the venturi 1a. A third suction port D3 is positioned at a location downstream of the throttle valve 3.

A fuel passage leading to the fuel nozzle 4 comprises a main fuel passage 5m and an auxiliary fuel passage 5s, both of which communicate with a float chamber, not shown, in which float chamber the passages 5m and 5s open below the fuel surface level. The auxiliary fuel passage 5s is provided with a fuel supply increasing valve 6. The valve 6 includes a movable valve element 7 arranged to open or close the auxiliary fuel passage 5s. The valve 6 also includes a diaphragm 8 connected to the valve element 7, and a valve spring 10 positioned within the suction pressure chamber 9 below the valve element 7. The spring 10 urges the valve element 7 in the valve-opening direction.

The suction chamber 9 of the fuel supply increasing valve 6 communicates with the third suction port D3 via a suction passage 11 in which a solenoid valve 12 is provided. This valve 12 operates to open the suction passage 11 when its solenoid is energized, and closes the same passage 11 and simultaneously connects the downstream side of the passage 11 with an air intake port 14 provided with a filter, when the solenoid is de-energized. Accordingly, the fuel supply increasing valve 6 is kept open to cause an increase in the quantity of fuel being injected through the fuel nozzle 4 when the solenoid valve 12 is de-activated, or when the solenoid valve 12 is activated while the suction pressure at the third suction port D3 is below a predetermined value. When the suction pressure at port D3 exceeds the predetermined value, the fuel supply increasing valve 6 is closed by activation of the solenoid valve 12 to interrupt the fuel increasing action. Control of the activation of the solenoid valve 12 is described below.

An exhaust gas recirculation conduit 15 extends from an exhaust port of the engine E and communicates with the intake manifold Mi, with a flow rate control valve 16 provided in the conduit 15. Valve 16 includes a movable valve element 17 operated by a diaphragm 18. A valve spring 20 is positioned within the suction chamber 19 formed above the diaphragm 18 and acts to urge the valve element 17 toward closed position.

The first suction line L1 extends from the suction port D1 through the solenoid-operated air valve 21 to the suction chamber 19 of the flow rate control valve 16. An orifice 24 is located downstream of the valve 21 in the suction line L1. A second suction line L2 extends from the suction port D2 to the suction chamber 19 by way of the solenoid-operated air valve 22 and the regulating valve 28. The air valves 21 and 22 each operate to close the upstream side of their respective suction lines L1 and L2, and simultaneously allow the downstream sides to communicate respectively with air intake ports 26 and 27 provided with filters, when their solenoids are energized.

The control valve generally designated 23 includes a suction pressure responsive-type regulating valve 28 arranged to open or close the second suction line L2, and also includes an air valve 29 of the suction pressure responsive-type adapted to adjust the suction pressure acting upon the regulating valve 28. The regulating valve 28 includes a valve chamber 30 connected to the second suction line L2 and also includes a suction chamber 32 separated from the valve chamber 30 by the diaphragm 31. A flat movable valve element 33 fixed to the diaphragm 31 opens and closes with respect to a valve port 48 at the open end of the line 11a extending between the regulating valve 28 and the recirculation control valve 16. A valve spring 20 urges the valve element 17 toward its closed position.

The air valve 29 is comprised of a valve chamber 36 positioned in a third suction line L3 extending from the third suction port D3 and leading to an air intake port 35 provided with a filter. A suction chamber 38 is separated from the valve chamber 36 by the diaphragm 37. A movable valve element 39 secured on the diaphragm 37 is positioned to vary the opening of a valve port 49 formed at the open end of the third suction line L3. A valve spring 40 is arranged to urge the valve element 39 in its closing direction. The valve element 39 of this valve 29 has a configuration similar to that of the valve element 17 of the aforementioned flow rate control valve 16. The suction chamber 38 communicates with the first suction line L1 located downstream of the regulating valve 28, while the valve chamber 36 communicates with the pressure chamber 32 via an orifice 41. Another orifice 42 is provided at a location between the valve chamber 36 and the air intake port 35.

In the present specification, the terms "upstream side" and "downstream side" of the suction lines mean "suction pressure supply source side" and "air intake port side", respectively.

When the solenoid valves 21, 22 are de-activated, the suction pressure control valve 23 operates as follows:

A suction pressure is produced in the vicinity of the throttle valve 3 or at a location downstream of same as the engine E operates, and is detected as suction pressure Pc at the first suction pressure port D1. The suction pressure Pc is transmitted to the chamber 38 of the air valve 29 via the solenoid valve 21 and the orifice 24, so that when the suction pressure Pc overcomes the setting load of the valve spring 40, it lifts the valve element 39 together with the diaphragm 37 to open the third suction pressure line L3.

When the third suction pressure line L3 is thus opened, atmospheric air is introduced into the third suction line L3 via the intake port 35 and then into the intake passage 1 of the engine E. As a consequence, suction pressure P produced in the valve chamber 36 of the air valve 29 is transmitted to the suction chamber 32 of the regulating valve 28. When the difference between the suction pressure P and the suction pressure Pv, at the second suction port D2, overcomes the setting load of the valve spring 34, the valve element 33 is lifted together with the diaphragm 31 to open the valve port 48. Part of the suction pressure Pv escapes through the valve port 48 to dilute or reduce the intensity of the suction pressure which has previously passed the orifice 24 into suction pressure Pe in line 11a. This suction pressure Pe serves as actuating pressure for the flow rate control valve 16.

Due to the above dilution or reduction of intensity in the suction pressure, the suction pressure present in the chamber 38 is reduced, and accordingly the opening of the air valve 29 is reduced which results in a corresponding decrease in the suction pressure in the valve chamber 36. The suction pressure in the chamber 32 of the regulating valve 28 also decreases so that the valve element 33 closes the valve port 48. Then the suction pressure Pe increases. This cycle of operation is repeated. Since this repetition occurs very quickly, the quantity of air travelling in the third suction passage L3 becomes proportional to the quantity of air being sucked into the engine E so that the suction pressure P has a value approximate to that of the suction pressure Pv.

Thus, when the quantity of air being sucked into the engine E is small, the suction pressure P is higher than the suction pressure Pv and accordingly the valve element 33 of the regulating valve 28 is displaced into its open position to decrease the actuating pressure P3 for the flow rate control valve 28. On the other hand, when the quantity of suction air increases, the suction pressure Pv increases so that the valve element 33 is displaced into its closing position to increase the actuating pressure Pe. In this manner, the air valve 29 and the flow rate control valve 16 are actuated by the same suction pressure Pe. Further, their respective valve elements 39, 17 are similar in configuration to each other. Therefore, the quantity of air flowing in the third suction pressure passage L3, that is, the quantity of air being sucked into the engine E, is proportional to the quantity of exhaust gas being returned to the suction passage so that the engine E can be supplied with exhaust gas at a permanently constant return ratio.

On the other hand, when the solenoid valve 22 is activated to block the upstream side of the second suction pressure line L2 and simultaneously allow the downstream side of same to communicate with the air intake port 27, the regulating valve 28 has its valve chamber 30 supplied with atmospheric pressure which displaces the valve element 33 into its open position so that the actuating suction pressure Pe decreases. This reduces the opening of the flow rate control valve 16, resulting in a decrease in the flow rate of exhaust gas being recirculated.

When the other solenoid valve 21 is activated to block the upstream side of the first suction line L1 and simultaneously allows the downstream side of same to communicate with the air intake port 26, the actuating suction pressure Pe is replaced by atmospheric pressure to bring the flow rate control valve 16 into its closed position, resulting in interruption of the recirculation of exhaust gas.

The control system for the above-mentioned solenoid valves 12, 21, 22 is mainly comprised of first and second vehicle speed sensing switches Ss1, Ss2, an engine temperature sensing switch St, and first and second vacuum pressure detecting switches Sv1, Sv2. The switch Ss1 closes when the vehicle speed is in a high range (e.g., 45 km/h or more), the switch Ss2 opens when the vehicle speed is low (e.g., 20 km/h or less), the switch St detects the temperature of engine cooling water as engine temperature and closes when the temperature is in a low range (e.g., 70° C. or less), and the switch Sv1 closes when the suction pressure detected by the third suction port D3 exceeds a relatively larger predetermined value (e.g., 500 mm Hg). The switch Sv2 closes when said suction pressure exceeds a relatively smaller predetermined value (e.g., 300 mm Hg). The first vacuum pressure detecting switch Sv1 is provided with a means for correcting the actuating suction pressure in response to changes in the atmospheric pressure.

Figure 2:
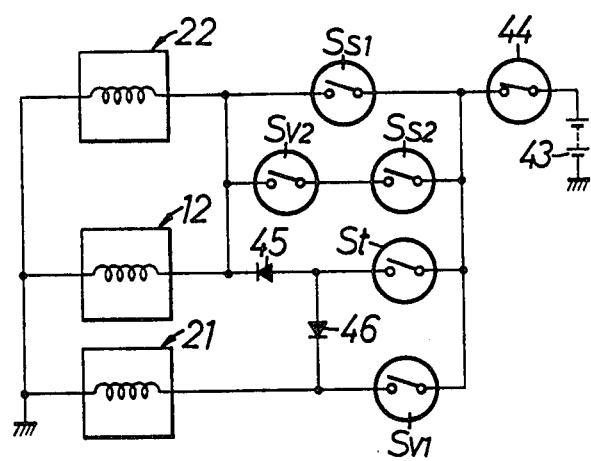
FIG. 2 is a wiring diagram.

The electrical circuit elements constituting the control system shown in FIG. 1 can be arranged as shown in FIG. 2. Thus, the second vehicle speed sensing switch Ss2 and the second suction pressure sensing switch Sv2 are connected in series with each other, this pair of switches being connected in parallel with the first vehicle speed sensing switch Ss1, and also connected in parallel with the temperature sensing switch St. The power source is shown at 43, the engine ignition switch at 44, and diodes are shown at 45 and 46.

The operation of the control system with the above arrangement will now be described.

During Cold State of the Engine

In this state, the engine temperature sensing switch St is on to activate the solenoid valve 12 so that the fuel supply increasing valve 6 has its chamber 9 supplied with suction pressure from the third suction port D3. As this suction pressure increases, the valve element 7 is displaced so as to reduce the quantity of fuel injected through the fuel nozzle 4, resulting in a leaner mixture being delivered by the carburetor C.

When the switch St is thus on, the solenoid valve 21 is also activated and accordingly the flow rate control valve 16 is kept in its closed position, and exhaust gas recirculation is not carried out, since the actuating suction pressure Pe is replaced by atmospheric pressure. This interruption of exhaust gas recirculation is effected for the reason that when the engine E is in a cold state, unburned components (HC, CO) are apt to be produced in large quantities due to low combustion temperature of the mixture. Therefore the mixture should be made leaner so as to minimize production of such unburned components. Nitrogen oxides are not produced in appreciable quantities during the cold state of the engine because of the low combustion temperature, even in the absence of exhaust gas recirculation.

During Warmed-up State of the Engine

A. In a low vehicle speed range (e.g., 20 km/h or less):

In this state, the engine temperature sensing switch St, the first and second vehicle speed sensing switches Ss1, Ss2, and the first and second vacuum pressure sensing switches Sv1, Sv2 are all in the off position, and accordingly the solenoid valves 12, 21 and 22 are all de-activated. Since the suction pressure chamber 9 of the fuel supply increasing valve 6 is supplied with atmospheric pressure via the air intake port 14 during deactivation of the valve 12, as previously mentioned, the valve element 7 is displaced to its maximum opening position so that the rate at which fuel is injected through the fuel nozzle 4 is increased. Therefore, the engine power can be increased when the vehicle is accelerated on starting, thus improving acceleration. Particularly, the present system can be advantageously applied to an engine operating on a lean mixture.

On the other hand, when the solenoid valves 21, 22 are de-activated, the first and second suction pressure lines L1, L2 are both held open so that, as previously mentioned, the flow rate control valve 16 has its opening regulated to a value appropriate for the quantity of suction air supplied to the engine. This is caused by the action of the actuating suction pressure Pe which is controlled by the suction pressure control valve 23, resulting in supply of exhaust gas into the suction passage through the exhaust gas recirculation passage 15 at a required and sufficient flow rate. Thus, the production of unwanted nitrogen oxides due to the elevated engine power can be effectively restrained. This controlled state is contained even if either one of the switches Ss2 or Sv2 remains on, so long as the first vehicle speed sensing switch Ss1 is kept in the off position.

B. In the vehicle speed range of 20–45 km/h:

(1) When the suction pressure is below 300 mm/hg:

In this state the first vehicle speed sensing switch Ss1 is in the off position, the second vehicle speed sensing switch Ss2 is on, and the second suction pressure sensing switch Sv2 is off. Therefore, the solenoid valves 12 and 22 are both de-activated so that the fuel supply increasing valve 6 and the flow rate control valve 16 are in operative state similar to those in the preceding paragraph A. Therefore, excellent acceleration characteristics are obtained in both low and middle speed ranges, and consequently the production of nitrogen oxides can be effectively restrained.

(2) When the suction pressure exceeds 300 mm/hg:

In this state the first vehicle speed sensing switch Ss1 is off. The second vehicle speed sensing switch Ss2 and the second suction pressure sensing switch Sv2 are both on. The solenoid valves 12 and 22 are activated by way of these closed switch Ss2, Sv2, so that the fuel supply increasing valve 6 has its fuel increasing function weakened or eliminated by suction pressure detected by the third suction pressure detecting port D3 and supplied to the suction pressure chamber 9. At the same time, the actuating suction pressure Pe drops by the action of the aforementioned suction pressure control valve 23 to move the return gas flow rate control valve 16 toward closed position, resulting in reduction in the flow rate of exhaust gas being recirculated. Thus, the fuel consumption characteristic during continuous low speed running of the vehicle is improved.

C. In a high vehicle speed range (e.g., 45 km/h or more):

In this speed range, the first vehicle speed sensing switch S1 closes, to activate the solenoid valves 12 and 22. The fuel increasing valve 6 then has its suction pressure chamber 9 supplied with suction pressure from the third suction port D3 to weaken its fuel quantity increasing function. At the same time, the suction pressure control valve 23 acts to reduce the actuating suction pressure Pe so that the flow rate control valve 16 has its opening reduced to correspondingly reduce the flow rate of recirculating exhaust gas. In this manner, the fuel consumption rate can be reduced while maintaining a satisfactory level of engine power.

D. During Deceleration:

The throttle valve 3 may be suddenly closed during high speed running of the vehicle, to cause deceleration of the engine. In this state, if a suction pressure higher than that produced in idling, 500 mm Hg or more for example, is produced in a zone downstream of the throttle valve 3, the first suction pressure sensing switch Sv1 closes. The solenoid valve 21 is accordingly activated to cause the return gas flow rate control valve 16 to be closed to interrupt exhaust gas recirculation. This interruption is effected for the reason that nitrogen oxides are produced in negligible quantities during deceleration of the engine and that the occurrence of unburned components in the exhaust gas, which would be produced by exhaust gas recirculation, should be restrained.

In the above-described embodiment, the solenoid valve 22 constitutes a first control valve of the present invention, the solenoid valve 12 a second control valve, the first vehicle speed sensing switch Ss1 a first vehicle speed sensor, and the second vehicle speed sensing switch Ss2 a second vehicle speed sensor.

As set forth above, according to the present invention, a first vehicle speed sensor responsive to a relatively higher vehicle speed and a second vehicle speed sensor responsive to a relatively lower vehicle speed are connected to a first control valve for controlling a return gas flow rate control valve and a second control valve for controlling an auxiliary fuel supply means. The return gas flow rate control valve and the auxiliary fuel supply means are controlled so that in a low vehicle speed range the return gas flow rate and the auxiliary fuel supply quantity are increased, while in a high vehicle speed range, they are decreased. With this arrangement and manner of control, the driveability, i.e., starting-accelerating ability of the vehicle in a low speed range can be improved, while simultaneously reduction of air contamination due to exhaust gas can be fully achieved. On the other hand, in a high vehicle speed range, the fuel consumption characteristic can be improved while minimizing the engine power reduction.

Having fully described our invention, it is to be understood that we are not to be limited to the details herein set forth but that our invention is of the full scope of the appended claims.

We claim:

1. A mixture control system for an internal combustion engine for a vehicle, the engine having an intake passage with a pressure responsive auxiliary fuel supply means, and having an exhaust gas recirculation passage, the improvement comprising, in combination: a flow regulating valve in the exhaust gas recirculation passage, said regulating valve being responsive to suction pressure in the engine intake passage, a first control valve for limiting suction pressure applied from said intake passage to said regulating valve, a second control valve for operating the pressure responsive auxiliary fuel supply means, first and second vehicle speed sensors connected to said first and second control valves, respectively, the first vehicle speed sensor being responsive to a relatively high vehicle speed, the second vehicle speed sensor being responsive to a relatively low vehicle speed, whereby said regulating valve and said auxiliary fuel supply means are controlled in a manner such that the flow rate of exhaust gas being recirculated and the quantity of auxiliary fuel being supplied to the engine are increased in a lower vehicle speed range, and decreased in a higher vehicle speed range.

2. The mixture control system for an engine as recited in claim 1, wherein the first and second control valves are connected to said second vehicle speed sensor by way of a suction pressure sensor which is responsive to a suction pressure produced by the operation of the engine and exceeding a predetermined intensity.

3. The mixture control system for an engine as recited in claim 1 including an engine temperature sensor responsive to an engine temperature below a predetermined value, said temperature sensor being connected to said first and second control valves in parallel with said first and second vehicle speed sensors.

4. The mixture control system for an engine as recited in claim 1, comprising: a first suction pressure line connected to a suction pressure chamber provided in said flow regulating valve, a carburetor forming part of the intake passage and having a venturi opening, a throttle valve in the carburetor, said first suction pressure line extending from a first suction pressure detecting port opening in the vicinity of the throttle valve, a second suction pressure detecting port opening at the carburetor venturi, a second suction pressure line extending from said second suction pressure detedting port, a pressure control valve connected to said suction pressure lines for controlling the degree of dilution of suction pressure detected by said first suction pressure detecting port by admixture with suction pressure detected by said second suction pressure detecting port, said pressure control valve comprising a regulating valve including a valve chamber in said second suction pressure line, a suction pressure chamber adjacent to said valve chamber and separated therefrom by a diaphragm, a connecting line extending between said suction pressure chamber of the flow regulating valve and the valve chamber, a valve element secured to the diaphragm for opening or closing an open end of the connecting line, an air valve including a valve chamber provided in a control suction air line connected to said intake passage at a location downstream of said throttle valve and communicating with said suction pressure chamber of said regulating valve, a suction pressure chamber formed adjacent to said valve chamber and separated therefrom by a diaphragm and communicating with the suction pressure chamber provided in said flow regulating valve, and a valve element secured to said diaphragm for opening and closing the downstream side of said control suction air line, an orifice operatively positioned between said air valve and an air intake port leading to said control suction air line, said second suction pressure line including said first control valve and communicating to atmosphere when said first control valve is operated.

5. A mixture control system for an engine applied to a vehicle, the engine having an intake passage with an auxiliary fuel supply means, and having a recirculation control valve provided in an exhaust gas recirculation line which extends from an exhaust passage of the engine and leads to the intake passage, the control system comprising, in combination: regulating control valve means for controlling the recirculation control valve, first control valve means for controlling the regulating control valve to vary the flow rate of exhaust gas recirculation through the recirculation control valve, second control valve means for controlling the auxiliary fuel supply means to vary the rate of delivery of auxiliary fuel, first and second vehicle speed sensors connected to said first and second control valve means, respectively, the first vehicle speed sensor being responsive to a relatively high vehicle speed, the second vehicle speed sensor being responsive to a relatively low vehicle speed, whereby said recirculation control valve and said auxiliary fuel supply means are controlled in a manner such that the flow rate of exhaust gas being recirculated and the rate of delivery of auxiliary fuel being supplied to the engine are increased in a lower vehicle speed range, and decreased in a higher vehicle speed range.

6. The mixture control system for an engine as recited in claim 5, wherein the first and second control valves are connected to said second vehicle speed sensor by way of a suction pressure sensor which is responsive to a suction pressure produced by the operation of the engine and exceeding a predetermined intensity.

7. The mixture control system for an engine as recited in claim 5 including an engine temperature sensor responsive to an engine temperature below a predetermined value, said temperature sensor being connected to said first and second control valves in parallel with said first and second vehicle speed sensors.

* * * * *